United States Patent
Mayer et al.

(10) Patent No.: US 10,099,660 B2
(45) Date of Patent: Oct. 16, 2018

(54) TRUCK-MOUNTED CONCRETE PUMP AND METHOD FOR OPERATING SAME

(71) Applicant: Putzmeister Engineering GmbH, Aichtal (DE)

(72) Inventors: Martin Mayer, Reutlingen (DE); Jens Kaupp, Tübingen (DE); Dirk Jahn, Nürtingen (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 15/416,780

(22) Filed: Jan. 26, 2017

(65) Prior Publication Data

US 2017/0144635 A1 May 25, 2017

Related U.S. Application Data

(63) Continuation of application No. PCT/EP2015/067383, filed on Jul. 29, 2015.

(30) Foreign Application Priority Data

Jul. 30, 2014 (DE) .......................... 10 2014 215 019

(51) Int. Cl.
| | |
|---|---|
| *B60K 6/20* | (2007.10) |
| *B60L 11/02* | (2006.01) |
| *B60L 11/12* | (2006.01) |
| *B60L 11/14* | (2006.01) |
| *B60S 9/02* | (2006.01) |

(Continued)

(52) U.S. Cl.
CPC .............. *B60S 9/02* (2013.01); *B66C 23/905* (2013.01); *E04G 21/0436* (2013.01); *E04G 21/0445* (2013.01); *E04G 21/0463* (2013.01)

(58) Field of Classification Search
CPC ..... B60K 6/20; B60L 15/007; B60L 2200/40; B60L 11/02; B60L 11/12; B60L 11/14
See application file for complete search history.

(56) References Cited

U.S. PATENT DOCUMENTS 3,116,806 A * 1/1964 Rose ...................... B62D 49/08
172/26
4,833,615 A * 5/1989 Bitner ................... B66C 15/045
340/685

(Continued)

FOREIGN PATENT DOCUMENTS

| DE | 102 42 270 A1 | 4/2004 |
|---|---|---|
| DE | 10 2006 049 487 A1 | 4/2007 |

(Continued)

OTHER PUBLICATIONS

English translation of the International Preliminary Report on Patentability, PCT/EP2015/067383, dated Aug. 31, 2016.

(Continued)

*Primary Examiner* — Bryan A Evans
(74) *Attorney, Agent, or Firm* — Bose McKinney & Evans LLP

(57) ABSTRACT

This disclosure relates to a truck-mounted concrete pump comprising a concrete-distributing boom which is constituted by a plurality of folding boom arms and rotationally mounted on a slewing gear on a chassis, and a tilt sensor for detecting a tilt of the truck-mounted concrete pump. According to this disclosure, the truck-mounted concrete pump is provided with a safety device which restricts the operating range of the concrete-distributing boom subject to a tilt of the pump, said safety device being coupled to the tilt sensor. The safety device is designed to limit the slewing motion on the slewing gear and/or the swiveling motion of at least one boom arm.

16 Claims, 2 Drawing Sheets

(51) Int. Cl.
*E04G 21/04* (2006.01)
*B66C 23/90* (2006.01)

(56) References Cited

U.S. PATENT DOCUMENTS

| | | | |
|---|---|---|---|
| 6,351,696 B1 * | 2/2002 | Krasny | E04G 21/0436 |
| | | | 701/50 |
| 7,909,059 B2 * | 3/2011 | Wehner | B66C 23/78 |
| | | | 137/615 |
| 2009/0283163 A1 | 11/2009 | Wehner et al. | |

FOREIGN PATENT DOCUMENTS

| | | |
|---|---|---|
| DE | 10 2006 031 257 A1 | 1/2008 |
| DE | 10 2009 010 334 A1 | 9/2009 |
| DE | 10 2012 106 222 A1 | 1/2014 |
| EP | 0 154 069 A2 | 9/1985 |
| EP | 2 733 281 A1 | 5/2014 |
| EP | 1849931 B1 | 11/2016 |
| JP | 2002-046998 A | 2/2002 |
| JP | 2003-155759 A | 5/2003 |

OTHER PUBLICATIONS

Communication from EPO of Third Party Observation, EP 3175060, Feb. 21, 2018, 6 pages.
Response to Third Party Objection, EP 3175060, May 27, 2018, 5 pages.
Decision to Grant European Patent, EP 3175060, dated Jun. 7, 2018, 3 pages.

* cited by examiner

TRUCK-MOUNTED CONCRETE PUMP AND METHOD FOR OPERATING SAME

RELATED APPLICATIONS

This application is a continuation of PCT/EP2015/067383, filed Jul. 29, 2015, which claims priority to DE 10 2014 215 019.1, filed Jul. 30, 2014, both of which are hereby incorporated herein by reference in their entireties.

BACKGROUND

The invention relates to a method for operating a truck-mounted concrete pump on the chassis of which a concrete-distributing boom, having a plurality of swivelable boom arms, is arranged rotatably on a slewing gear. The invention further relates to a truck-mounted concrete pump with a concrete-distributing boom having a plurality of swivelable boom arms and arranged rotatably on a slewing gear on a chassis, and with a tilt sensor for detecting an inclination of the truck-mounted concrete pump.

Truck-mounted concrete pumps of this type are used on building sites in order to deliver concrete in a specified manner from the pump system via a concrete-distributing boom to variable work locations, the boom arms being moved, generally in a remote-controlled manner, by means of swivel drives. In order to ensure the required static stability, the machines must be supported during the working and pumping operation. In this regard it may happen that the environment at the building site has a slope of 3° and more. The machines are currently designed such that a maximum tilt thereof of 3° is permitted. Larger inclinations overload, inter alia, the slewing gear of the distributing boom and carry a risk of accident. In particular, there is a danger that stability and static safety limits may be exceeded. The inclination can be checked visually by the operator using a spirit level to measure tilt. In some cases additional measures must be taken.

SUMMARY

Starting from the above considerations, it is desirable to improve the devices and methods known from the prior art and to provide an extended operating capability together with a reduced safety risk.

This disclosure is based on the concept of detecting the inclination at the work location by means of sensors, and assisting the operator in operating the machine by program-controlled restriction of the operating range. Accordingly, with regard to the method, it is proposed that the inclination of the truck-mounted concrete pump is determined at the work location and that the operating range of the concrete-distributing boom is restricted by limiting the rotational movement at the slewing gear, and/or the swiveling movement of at least one boom arm, as a function of the inclination. Safe operation is thereby made possible even in the case of relatively large terrain slopes without the need for the operator to intervene independently in the system or to take account of complex operating conditions.

Advantageously, the operating range is restricted as a function of the varying position of the center of gravity of the truck-mounted concrete pump resulting from the movement of the concrete-distributing boom, in such a way that the center of gravity remains within the tipping limits of the truck-mounted concrete pump.

A further aspect provides that the operating range is restricted to avoid overstressing of components or overloading of structural members of the truck-mounted concrete pump. Here, in particular, the inclination of the slewing gear or the slant of support arms may be considered within defined limits.

A further advantageous embodiment provides that the chassis is supported by means of at least three, preferably four extendable support arms and that the operating range is restricted according to the support configuration. The support configuration may be allowed for with reference to variable or fixed support arm positions (for example, full-width support or reduced-width support) while taking account of the degree of tilt, while a loading limit of the support arms may also be respected with regard, for example, to slope-induced downward forces.

It is also advantageous if the detected inclination of the truck-mounted concrete pump is compared to a predetermined limit value, and if the operating range is restricted only if the limit value—set, for example, at 3°—is exceeded.

To make possible automatic control it is advantageous if the inclination of the truck-mounted concrete pump is detected by means of a vehicle-mounted tilt sensor. In this case, the tilt of the vehicle vertical axis of the truck-mounted concrete pump may be detected by sensor means relative to the axis of gravity or to the horizon and/or to the terrain surface at the work location.

In order to determine control parameters with an equipment cost as low as possible, it is advantageous if an angle of tilt of the truck-mounted concrete pump is detected both before and after the vehicle has been supported at the work location. In this way the terrain slope and the deviation therefrom of the three-dimensional inclination of the machine, depending on its supported position, can be incorporated in the calculation of the admissible operating range.

As a general control principle, it is advantageous if the horizontal reach of the concrete-distributing boom is limited increasingly with increasing inclination of the truck-mounted concrete pump, so that the necessary static stability is always ensured and components are not overstressed.

An especially simple variant, which is also uncomplicated for the operator, provides that the operating range of the concrete-distributing boom is restricted by setting the swiveled position of the first boom arm on the slewing gear at a predetermined angle. Alternatively, it is possible for the operating range of the concrete-distributing boom to be restricted by limiting the swiveling range of the first boom arm in relation to the horizontal.

According to a further advantageous embodiment, the three-dimensional orientation of the truck-mounted concrete pump relative to the axis of gravity, or the three-dimensional inclination of the truck-mounted concrete pump, is detected, and the operating range of the concrete-distributing boom is restricted in dependence on said orientation or on said three-dimensional inclination, in particular by limiting the rotational range at the slewing gear.

It is also advantageous for an improved human-machine interaction if the instantaneously possible reach of the concrete-distributing boom is displayed for an operator via a display device.

As a further safety feature it is also advantageous if the movement of the concrete-distributing boom is stopped automatically upon reaching a limit of the operating range.

It is also possible that the velocities and/or accelerations of the movement of the slewing gear or of the boom arms are limited as a function of the inclination, so that overstressing or additional tipping moments are avoided.

The aforementioned advantages are also obtained for a truck-mounted concrete pump on which a concrete-distributing boom consisting of a plurality of swivelable boom arms and arranged rotatably on a slewing gear on a chassis, and a tilt sensor for detecting an inclination of the truck-mounted concrete pump, are provided, wherein a system coupled to the tilt sensor is configured, in particular, as a safety device for restricting the operating range of the concrete-distributing boom as a function of the inclination, and wherein the system or safety device is adapted to limit the rotational movement at the slewing gear and/or the swiveling movement of at least one boom arm.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
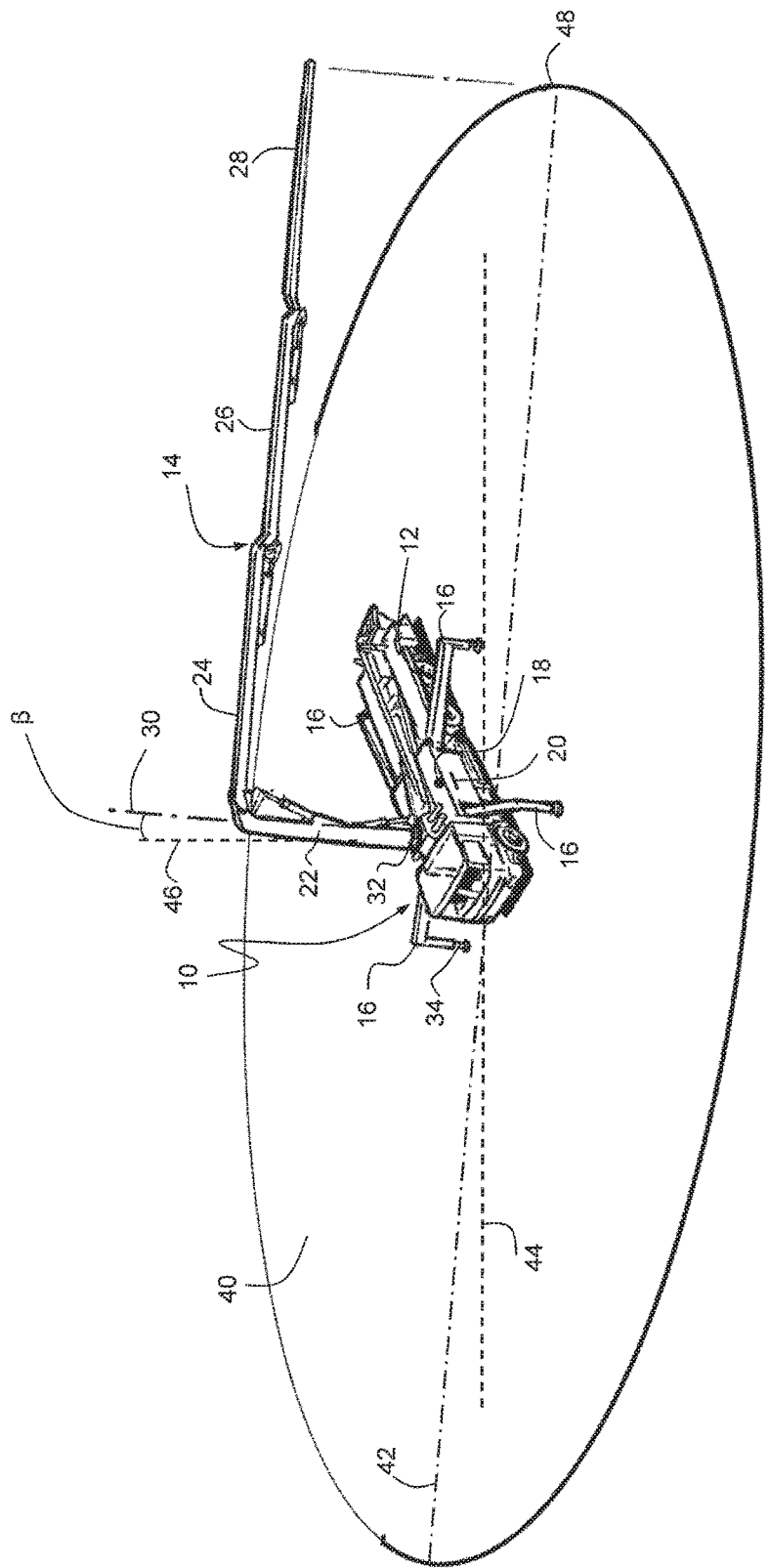
FIG. 1 is a perspective view of a truck-mounted concrete pump in an inclined position with restricted operating range of the concrete-distributing boom.

The truck-mounted concrete pump 10 shown in FIG. 1 comprises a vehicle with a chassis 12, a four-armed concrete-distributing boom 14 arranged thereon and serving as a carrier for a concrete delivery pipe, four laterally extendable support arms 16 for providing support in operation and a computer-aided safety device 20 coupled to at least one tilt sensor 18 for restricting the operating range of the concrete-distributing boom 14 as a function of an inclination of the vehicle.

In the exemplary embodiment shown, the concrete-distributing boom 14 comprises four boom arms 22, 24, 26, 28 in the form of pivot-jointed extendable arms. The first boom arm 22 is articulated at one end to a boom bearer or slewing gear 32 which is rotatable about a vertical axis 30 of the chassis 12 by activation of a rotary drive. Furthermore, the boom arms 22, 24, 26, 28 are swivelable, by associated swivel drives, about horizontal axes with respect to the slewing gear 32 and to each adjacent boom arm. The final boom arm 28 carries at its free end an end hose of the concrete delivery pipe (not shown separately).

The front extendable support arms 16 can be deployed telescopically from a retracted travelling position to an extended, obliquely forward-oriented support position. The two rear extendable support arms can be swiveled from a travelling position aligned parallel to the chassis to an obliquely rearward-oriented support position. All the extendable support arms 16 have a telescopic support leg 34 with which they can be supported on a substrate while raising the chassis 12. Depending on the space requirement at the work location or building site, the extendable support arms 16 can be supported selectively on the substrate so as to form different deployment configurations: with their support legs 34 in an inner support position close to the chassis or in an outer support position at a distance from the chassis.

Figure 2:
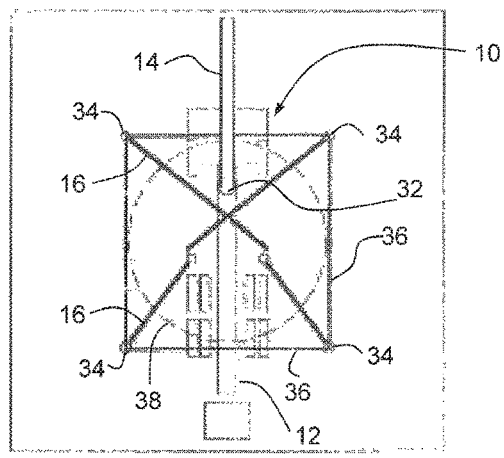
FIG. 2 shows a support configuration of a truck-mounted concrete pump in a schematic top view.

As represented in FIG. 2, the tipping limits 36 of the truck-mounted concrete pump 10 are defined by the position of the support legs 34. In order for the machine to stand securely, the center of gravity must always be located within the tipping limits 36, as is shown for a possible center of gravity line 38 during a 360° rotation of the concrete-distributing boom 14.

Accordingly, static stability is put at risk when vehicle inclination is outside an inclination range of, for example, not more than 3°. In addition, the support legs 34 and the slewing gear 32 can be overstressed by the direction-dependent loadings which occur with an inclined position of the vehicle.

FIG. 1 shows the case in which the terrain 40 at the work location has a terrain inclination 42 with respect to the horizontal 44, such that the vertical axis 30 deviates in operation from the axis of gravity 46 (normal to the horizontal) by an angle β of, for example, 5°. In this case the operating range 48 of the concrete-distributing boom 14 is restricted appropriately by the electronic safety device 20 in order to ensure the required static stability and to avoid overloadings. This is achieved by limiting the rotary motion at the slewing gear 32 and/or the swiveling movement of at least one boom arm as a function of the inclination of the truck-mounted concrete pump 10.

This inclination is suitably detected three-dimensionally and in a direction-dependent manner by means of the tilt sensor 18 mounted on the vehicle, so that not only the absolute inclination angle β, but also the horizontal angle of the largest inclination of the vehicle with respect to a zero position of the slewing gear 32, for example in the longitudinal direction of the vehicle, is also known.

In order to ensure the necessary static stability, different strategies for moving the boom can be determined by means of a software of the safety device 20. The horizontal reach of the concrete-distributing boom 14 should advantageously be limited increasingly with increasing inclination of the truck-mounted concrete pump 10. In principle, it might also be sufficient to limit the accelerations or jolting (time derivative of the acceleration).

An especially simple control routine provides that the operating range 48 is restricted by setting the swiveled position of the first boom arm 22 on the slewing gear 32 at a predetermined angle—for example 90°, as shown in FIG. 1, while the other boom arms 24, 26, 28 remain freely movable. This has the advantage that the operator can still ascertain visually the reach of the arms package in a simple manner.

Alternatively, it is possible for the swiveling range of the first boom arm 22 with respect to the horizontal to be limited (for example, between 90° and 45°), so that the swiveling range does not fall below a limit angle set as a function of the inclination and the support configuration.

A further configuration of the safety device 20 provides for a restriction of the range of rotation of the concrete-distributing boom 14 on the slewing gear 32. As already mentioned, a multi-axis tilt sensor 18 can determine three-dimensionally the inclination of the machine with respect to the axis of gravity. Accordingly, the range of rotation of the boom 14 can be restricted; for example, when the machine is located on a slope, a downhill segment of the angular range may be excluded (limiting the maximum angle with respect to the oblique plane or to the axis of the slope-induced downward force). This configuration may also be used in combination with the other possibilities.

Figure 3:
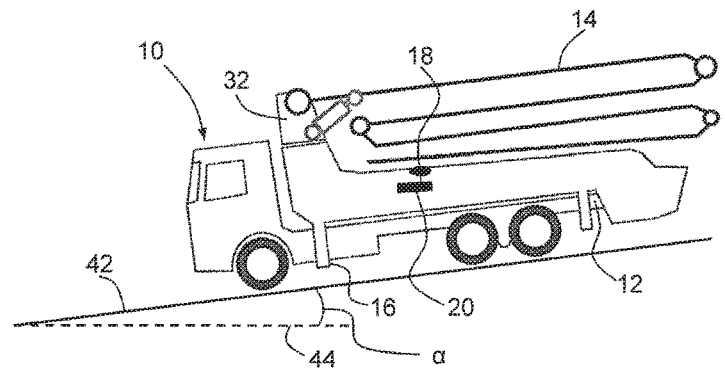
FIGS. 3 and 4 show side views of a truck-mounted concrete pump on inclined terrain in travelling and working positions.
Figure 4:
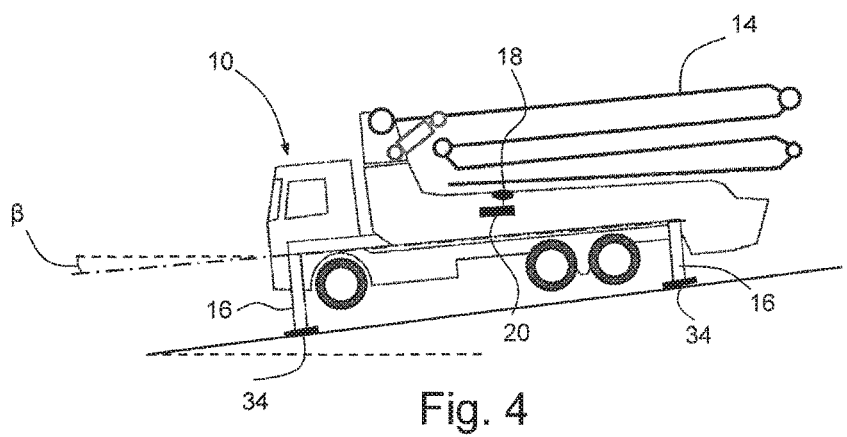

A possible process sequence is explained below with reference to FIGS. 3 and 4. The operator parks the truck-mounted concrete pump 10 at a work location where the terrain has a slope of more than 3°. The terrain slope α is detected by means of the vehicle-mounted tilt sensor 18 while the extendable support arms 16 are still retracted (FIG. 3). The support configuration in which the support legs 34 are extended by different amounts in order to reduce the inclination is then adopted (FIG. 4). In certain cases it is still not possible by this means to support the machine within a 3°-inclination range, although the inclination angle β is still smaller than the terrain slope angle α.

The elevated inclination can be displayed to the operator via a display system, for example, on a radio control system for the distributing boom 14. According to the inclination, the safety device 20 determines which possibilities the operator has for operating the distributing boom 14. For example, the operating range 48 may be adapted on the basis of the support configuration. In the case of full-width support, the complete rotational range of the slewing gear may be permitted, whereas with reduced-width support a restricted swivel range is allowed. The horizontal reach of the boom arm package is restricted, for example, in dependence on the inclination (reduction of the tipping moment of the machine/truck-mounted concrete pump 10 and reduction of loading on components). The greater the inclination, the more the horizontal reach is restricted.

The horizontal position of the end hose can be ascertained by the safety device 20 by means of, for example, tilt or angle sensors on the individual boom arms. The possible radii of action may be displayed to the operator by means of a display device. If the operator moves the distributing boom 14 into a limit range determined by the safety device 20, movement of the boom is stopped automatically. Notification to the operator may be given on the display device. The operator may move the boom arm package back out of the limit range. Optionally, the operator may already be informed by a notification before the limit range has been reached. The notification may be effected visually, haptically or acoustically.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for operating a truck-mounted concrete pump on the chassis of which a concrete-distributing boom having a plurality of swivelable boom arms is rotatably arranged on a slewing gear, the method comprising the following steps:
   a) supporting the chassis at a work location by at least three extendable support arms;
   b) determining the inclination of the truck-mounted concrete pump;
   c) restricting the operating range of the concrete-distributing boom by limiting the rotational movement at the slewing gear and/or the swiveling movement of at least one boom arm as a function of the inclination;
   d) wherein a slope defined by support legs of the extendable support arms is considered in order to avoid overstressing.

2. The method as claimed in claim 1, wherein the operating range is restricted according to the varying position of the center of gravity of the truck-mounted concrete pump resulting from the movement of the concrete-distributing boom such that the center of gravity remains within the tipping limits of the truck-mounted concrete pump.

3. The method as claimed in claim 1, wherein the operating range is restricted according to the support configuration of the extendable support arms.

4. The method as claimed in claim 1, wherein the detected inclination of the truck-mounted concrete pump is compared to a predetermined limit value and the operating range is restricted upon exceeding the limit value.

5. The method as claimed in claim 1, wherein the inclination of the truck-mounted concrete pump is detected by a vehicle-mounted tilt sensor.

6. The method as claimed in claim 1, wherein tilt of the vehicle vertical axis of the truck-mounted concrete pump relative to the axis of gravity and/or to the terrain surface at the work location is detected.

7. The method as claimed in claim 1, wherein a tilt angle of the truck-mounted concrete pump is detected by a single tilt sensor before and after the vehicle has been supported at the work location.

8. The method as claimed in claim 1, wherein horizontal reach of the concrete-distributing boom is increasingly limited with increasing inclination of the truck-mounted concrete pump.

9. The method as claimed in claim 1, wherein the operating range of the concrete-distributing boom is restricted by setting the swiveled position of a first one of the first boom arms on the slewing gear at a predetermined angle.

10. The method as claimed in claim 1, wherein the operating range of the concrete-distributing boom is restricted by limiting the swiveling range of a first on of the first boom arms with respect to horizontal.

11. The method as claimed in claim 1, wherein the three-dimensional orientation of the truck-mounted concrete pump is detected and the operating range of the concrete-distributing boom is restricted in an orientation-dependent manner.

12. The method as claimed in claim 11, wherein the restriction comprises limiting the rotational range at the slewing gear.

13. The method as claimed in claim 1, wherein the instantaneously possible reach of the concrete-distributing boom is displayed to an operator via a display device.

14. The method as claimed in claim 1, wherein movement of the concrete-distributing boom is automatically stopped upon reaching a limit of the operating range.

15. The method as claimed in claim 1, wherein velocities and/or accelerations of the movement of the slewing gear or of the boom arms are restricted as a function of the inclination.

16. A truck-mounted concrete pump, comprising:
   a concrete-distributing boom having a plurality of swivelable boom arms rotatably arranged on a slewing gear on a chassis;
   at least three support arms configured for supporting the chassis;
   a tilt sensor configured for detecting an inclination of the truck-mounted concrete pump;
   a system coupled to the tilt sensor for restricting the operating range of the concrete-distributing boom as a function of the inclination, wherein the system is configured to limit rotational movement at the slewing gear and/or swiveling movement of at least one of the boom arms and to consider a slope defined by support legs of the extendable extendable support arms within defined limits to avoid overstressing.

* * * * *

UNITED STATES PATENT AND TRADEMARK OFFICE
CERTIFICATE OF CORRECTION

PATENT NO. : 10,099,660 B2
APPLICATION NO. : 15/416780
DATED : October 16, 2018
INVENTOR(S) : Martin Mayer, Jens Kaupp and Dirk Jahn Page 1 of 1

It is certified that error appears in the above-identified patent and that said Letters Patent is hereby corrected as shown below:

In the Claims

Claim 10, Column 6, Lines 35-36, the phrase "a first on of the first boom arms" should read --a first one of the first boom arms--.

Claim 16, Column 7, Line 2, the phrase "the extendable extendable support arms" should read --the extendable support arms--.

Signed and Sealed this
Twenty-second Day of January, 2019

Andrei Iancu
*Director of the United States Patent and Trademark Office*